US012730792B2

(12) United States Patent
Kwon et al.

(10) Patent No.: US 12,730,792 B2
(45) Date of Patent: Sep. 8, 2026

(54) BRANCHING FOR TREE STRUCTURE IN DATABASE SYSTEM

(71) Applicant: SAP SE, Walldorf (DE)

(72) Inventors: Yong Sik Kwon, Seoul (KR); Kunsoo Park, Seoul (KR); Joong Chae Na, Seoul (KR); Seonho Lee, Seoul (KR); Bongki Moon, Seoul (KR); Yehyun Nam, Seoul (KR)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 17/555,979

(22) Filed: Dec. 20, 2021

(65) Prior Publication Data

US 2023/0195705 A1 Jun. 22, 2023

(51) Int. Cl.
*G06F 16/22* (2019.01)
*G06F 16/245* (2019.01)

(52) U.S. Cl.
CPC ...... *G06F 16/2246* (2019.01); *G06F 16/2272* (2019.01); *G06F 16/245* (2019.01)

(58) Field of Classification Search
CPC . G06F 16/2246; G06F 16/245; G06F 16/2272
See application file for complete search history.

(56) References Cited

U.S. PATENT DOCUMENTS 5,202,986 A * 4/1993 Nickel ................ G06F 16/9027
8,190,591 B2 * 5/2012 Shinjo .............. G06F 16/90344 707/706
2005/0091443 A1 * 4/2005 Hershkovich ....... G06F 16/2246 711/100
2009/0210414 A1 * 8/2009 Shinjo ................ G06F 16/2246 707/999.005
2010/0042597 A1 * 2/2010 Shinjo .............. G06F 16/90344 707/769

(Continued)

FOREIGN PATENT DOCUMENTS

CN 101286160 A 10/2008
CN 109977111 A 7/2019
CN 110637291 A 12/2019

(Continued)

OTHER PUBLICATIONS

Bayer et al., "Prefix B-Trees", ACM Transaction on Database Systems, vol. 2, No. 1, Mar. 1977, 16 pages.

(Continued)

*Primary Examiner* — Alicia M Willoughby
(74) *Attorney, Agent, or Firm* — Fountainhead Law Group, PC

(57) ABSTRACT

In some embodiments, a method determines a query distinction bit (D-bit) slice for a query key using values at D-bit positions that are associated with a node in the data structure. D-bit positions are determined based on branches in the data structure. The method selects a D-bit slice for a key in the set of keys for the node based on the D-bit slice of the query key and compares a key value for the key to a query key value for the query key to determine a first D-bit position value. A D-bit position that has a second D-bit position value that is smaller in value than the first D-bit position value is selected. The D-bit position is used to determine a result for the query key.

20 Claims, 14 Drawing Sheets

| | 0 | 1 | 2 | 3 | 4 | 5 | 6 | 7 | 8 | 9 |
|---|---|---|---|---|---|---|---|---|---|---|
| $DS_0$: | 0 | | 0 | 1 | | 1 | | 0 | | 1 |
| $DS_1$: | 0 | | 0 | 1 | | 1 | | 1 | | 0 |
| $DS_2$: | 1 | | 0 | 1 | | 0 | | 0 | | 0 |
| $DS_3$: | 1 | | 0 | 1 | | 0 | | 0 | | 1 |
| $DS_4$: | 1 | | 0 | 1 | | 0 | | 1 | | 0 |
| $DS_5$: | 1 | | 0 | 1 | | 0 | | 1 | | 1 |
| $DS_6$: | 1 | | 1 | 0 | | 1 | | 0 | | 1 |
| $DS_7$: | 1 | | 1 | 0 | | 1 | | 1 | | 0 |
| $DS_8$: | 1 | | 1 | 1 | | 1 | | 1 | | 0 |

(56) References Cited

U.S. PATENT DOCUMENTS

| | | | | |
|---|---|---|---|---|
| 2011/0066638 | A1* | 3/2011 | Shinjo | G06F 16/90344 707/769 |
| 2019/0034467 | A1* | 1/2019 | Kwon | G06F 16/2228 |

FOREIGN PATENT DOCUMENTS

| | | | |
|---|---|---|---|
| CN | 113810212 | A | 12/2021 |
| WO | WO2012110812 | A1 | 8/2012 |

OTHER PUBLICATIONS

Ferguson, "Bit-Tree a Data Structure for Fast File Processing" Communications of the ACM, vol. 35, No. 6, Jun. 1992, 7 pages.
Leis et al., "The Adaptive Radix Tree: ARTful Indexing for Main-Memory Databases", ICDE Conference 2013, 12 bages.
Binna et al., "HOT: A Height Optimized Trie Index for Main-Memory Database Systems", SIGMOD, Jun. 10-15, 2018, 14 pages.
Bohannon et al., "Main-Memory Index Structures With Fixed-Size Partial Keys", Acm Sigmod, May 21-24, 2001, 12 pages.
Extended European Search Report for EP Application No. 22203302.9-1203, dated May 4, 2023, 41 pages.
Yongsik Kwon et al., "Compressed Key Sort and Fast Index Reconstruction", arXiv:2009.11543v1 [cs.DB], Sep. 24, 2020, 26 pages.

* cited by examiner

| | 0 | 1 | 2 | 3 | 4 | 5 | 6 | 7 | 8 | 9 |
|---|---|---|---|---|---|---|---|---|---|---|
| $DS_0$: | 0 | | 0 | 1 | | 1 | | 0 | | 1 |
| $DS_1$: | 0 | | 0 | 1 | | 1 | | 1 | | 0 |
| $DS_2$: | 1 | | 0 | 1 | | 0 | | 0 | | 0 |
| $DS_3$: | 1 | | 0 | 1 | | 0 | | 0 | | 1 |
| $DS_4$: | 1 | | 0 | 1 | | 0 | | 1 | | 0 |
| $DS_5$: | 1 | | 0 | 1 | | 0 | | 1 | | 1 |
| $DS_6$: | 1 | | 1 | 0 | | 1 | | 0 | | 1 |
| $DS_7$: | 1 | | 1 | 0 | | 1 | | 1 | | 0 |
| $DS_8$: | 1 | | 1 | 1 | | 1 | | 1 | | 0 |

FIG. 2C

Figure 5:
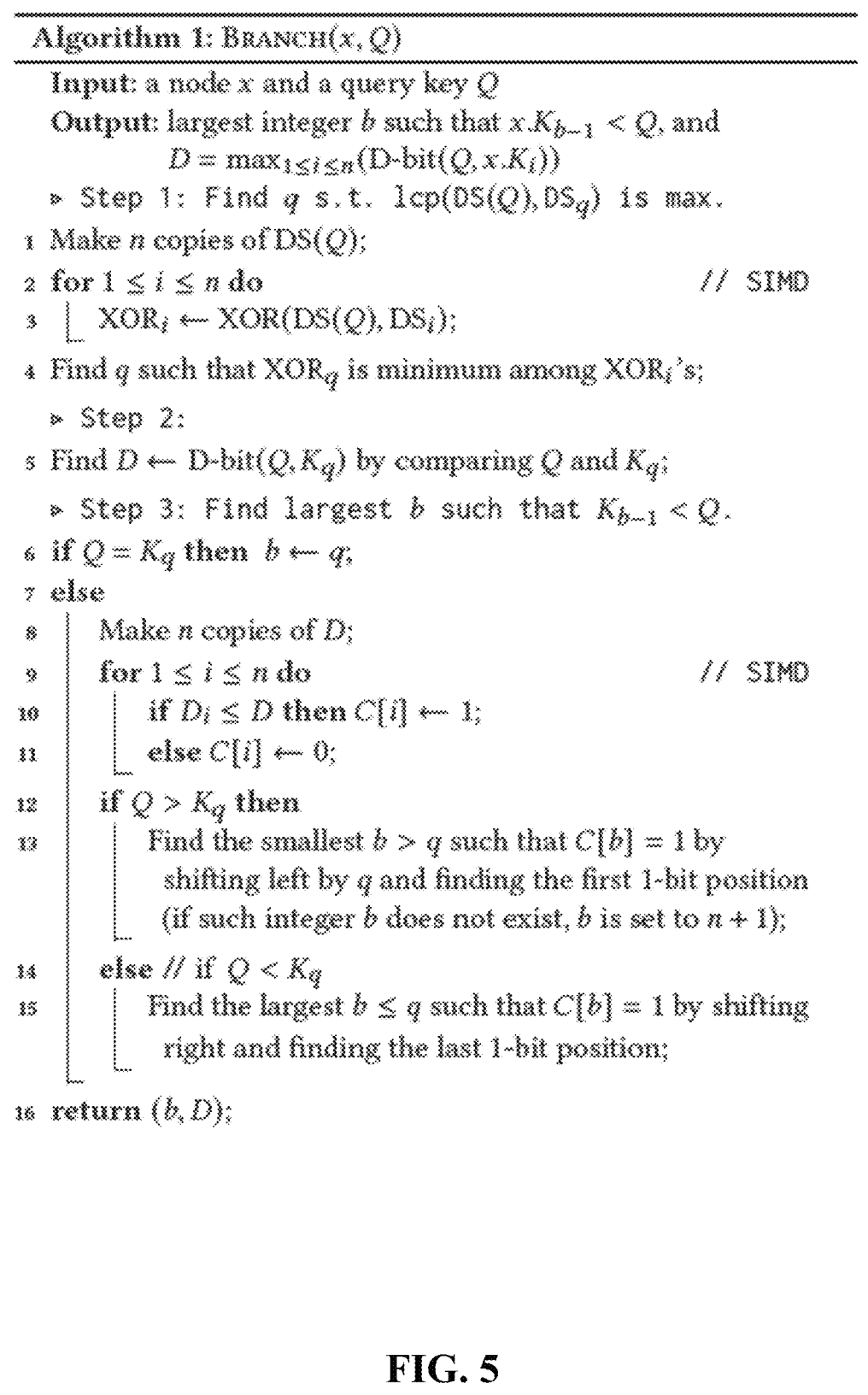

Algorithm 1: BRANCH$(x, Q)$

Input: a node $x$ and a query key $Q$

Output: largest integer $b$ such that $x.K_{b-1} < Q$, and $D = \max_{1 \leq i \leq n}(\text{D-bit}(Q, x.K_i))$ ▹ Step 1: Find $q$ s.t. $\text{lcp}(\text{DS}(Q), \text{DS}_q)$ is max.

Make $n$ copies of $\text{DS}(Q)$;

for $1 \leq i \leq n$ do // SIMD $\text{XOR}_i \leftarrow \text{XOR}(\text{DS}(Q), \text{DS}_i)$;

Find $q$ such that $\text{XOR}_q$ is minimum among $\text{XOR}_i$'s;

▹ Step 2:

Find $D \leftarrow \text{D-bit}(Q, K_q)$ by comparing $Q$ and $K_q$;

▹ Step 3: Find largest $b$ such that $K_{b-1} < Q$.

if $Q = K_q$ then $b \leftarrow q$;

else

Make $n$ copies of $D$;

for $1 \leq i \leq n$ do // SIMD if $D_i \leq D$ then $C[i] \leftarrow 1$;

else $C[i] \leftarrow 0$;

if $Q > K_q$ then

Find the smallest $b > q$ such that $C[b] = 1$ by shifting left by $q$ and finding the first 1-bit position (if such integer $b$ does not exist, $b$ is set to $n + 1$);

else // if $Q < K_q$

Find the largest $b \leq q$ such that $C[b] = 1$ by shifting right and finding the last 1-bit position;

return $(b, D)$;

| D-bit positions 1002 | D-bit slices 1004 | D positions 1006 | D masks 1008 |
| --- | --- | --- | --- |

FIG. 10

BRANCHING FOR TREE STRUCTURE IN DATABASE SYSTEM

BACKGROUND

A data structure, such as a B-tree and its variants, is used by database systems and applications for indexing and data access. The efficiency of the B-tree is a critical factor that determines the performance of the database system when accessing data. One optimization method for the B-tree centers around maintaining the highest possible fanout of the B-tree so that the number of input/output (I/O) operations to access the nodes of the B-tree and/or data that is required per database operation can be minimized. However, some database systems, such as ones that manage all or most of the data objects in memory, I/O operations may not be the dominant factor in performance optimization. Rather, the B-tree algorithms that are used to traverse the B-tree may require the most computational overhead. For example, when searching the B-tree, a large part of the search time is spent on branching operations, which determines which branch of the B-tree to search next.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2C shows an example of D-bit slices according to some embodiments.

FIG. 5 depicts pseudocode for performing the search described above with respect to FIG. 4 according to some embodiments.

FIG. 10 depicts an example of a data structure for a node according to some embodiments.

DETAILED DESCRIPTION

Described herein are techniques for a database system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A database system stores a data structure, referred to as a DB$^+$-tree, which includes a node structure that allows for faster branching operations. The DB$^+$-tree may be an index of the keys for data objects that are stored in a database system. The length of the keys may directly impact the performance of the system. To improve the performance, the DB$^+$-tree may store partial information for keys in a node. The partial information for keys may be referred to as a distinction bit slice (D-bit slice). The D-bit slices may be determined by analyzing the keys of the node to determine D-bit positions, which may be the most significant bit position where two bit strings differ. The bits at the D-bit positions may then form the D-bit slices. The information for the D-bit slices and the D-bit positions may be used to perform search and update operations for data objects in the database system using a more efficient branching algorithm.

System Overview

Figure 1:
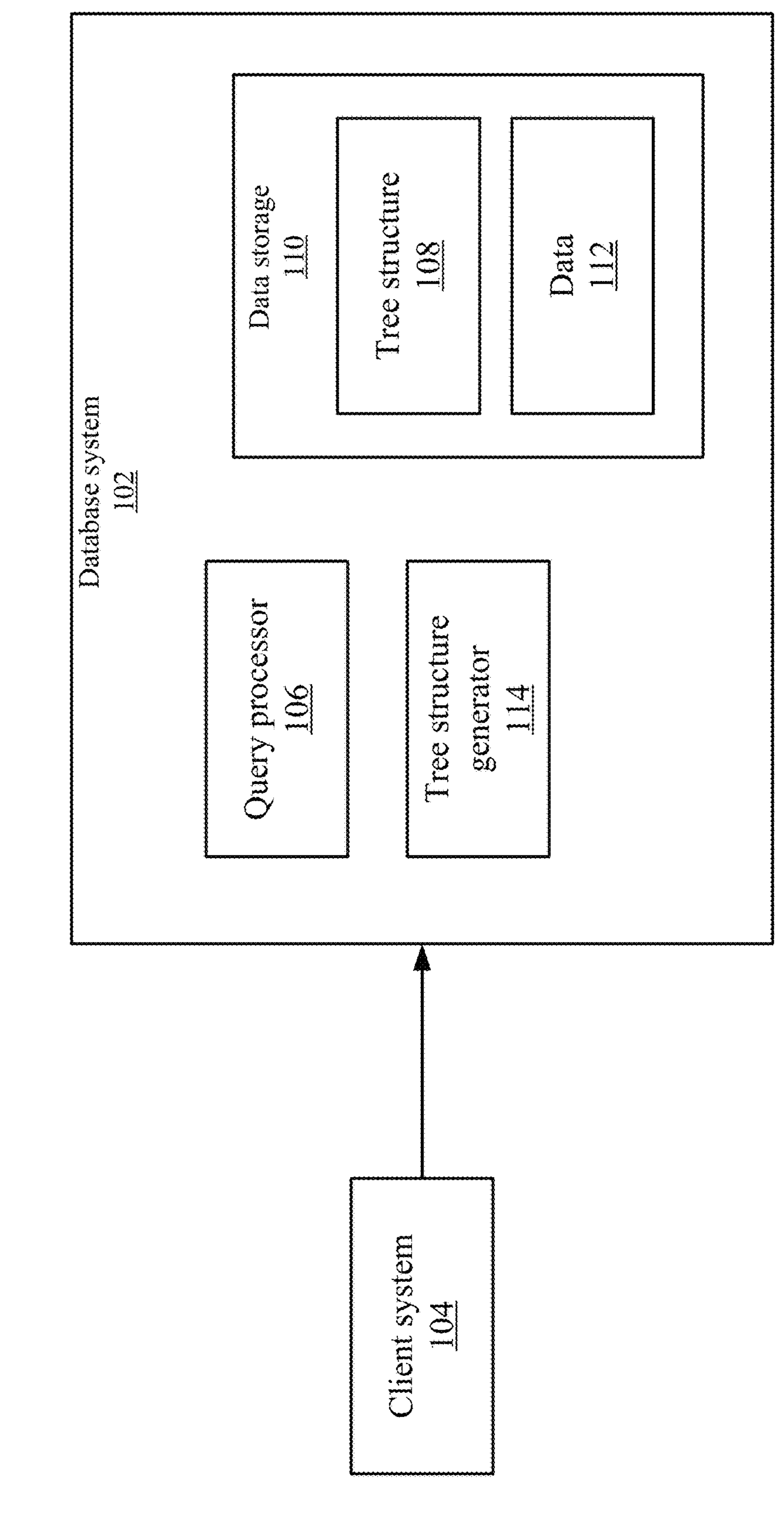
FIG. 1 depicts a simplified system for performing database operations according to some embodiments.

FIG. 1 depicts a simplified system 100 for performing database operations according to some embodiments. System 100 includes a database system 102 and a client system 104. Client system 104 may include one or more computers that can send queries to database system 102. The queries may include a query key, which may be a value, such as a binary string or another value that can be converted into a binary string. A query processor 106 may process the query by accessing data 112 that is stored in data storage 110. Data 112 may be data objects that may be any type of data, such as data records, files, tables, etc. Data storage 110 may be in-memory storage, which is local to a computing system that includes query processor 106. In other embodiments, data storage 110 may be remote storage. Also, some portions of data storage 110 may be stored in memory and remotely.

Query processor 106 uses a tree structure 108 to determine how to access data 112. For example, query processor 106 may search tree structure 108 to determine a key for the query key. The key may be associated with a pointer or other information that is used to access a location in data storage 110 that stores data for the key. Once the pointer is determined, query processor 106 accesses the data object that is associated with the pointer. Other operations may also be performed, such as keys in tree structure 108 may be inserted or deleted, which will be described in more detail below.

A tree structure generator 114 may generate tree structure 108. Tree structure 108 may be a tree that includes connected nodes that contain key values. Tree structure 108 may be referred to as a DB$^+$-tree. In some embodiments, the DB$^+$-tree is a variant of a B+-tree where the tree structure of the DB$^+$-tree may be similar to that of the B+ tree. For example, the DB$^+$-tree may be a m-ary tree, which may be a rooted tree in which each node has no more than m children. The DB$^+$-tree may include a root node, internal nodes, and leaf nodes. Each node of the DB$^+$-tree may include keys, but not key-value pairs. Also, an additional level may be added at the bottom of the DB$^+$-tree that includes a pointer to data objects for the keys, or the data objects may be stored with the node. The DB$^+$-tree may have a high fanout (e.g., a number of branches to child nodes in a node are high versus a low number of levels), which reduces the number of I/O operations required to find a key via the nodes in the tree. Also, leaf nodes may include pointers to a next leaf node in the DB$^+$-tree, which may be used in range searches, which are described below.

The DB$^+$-tree stores keys inside a node differently than the B+ tree. For example, the information about the keys may be partial information that is referred to as distinction bit (D-bit) information. The D-bit information allows for faster branching operations to be performed, which will be described below.

D-Bit Information

Figure 2A:
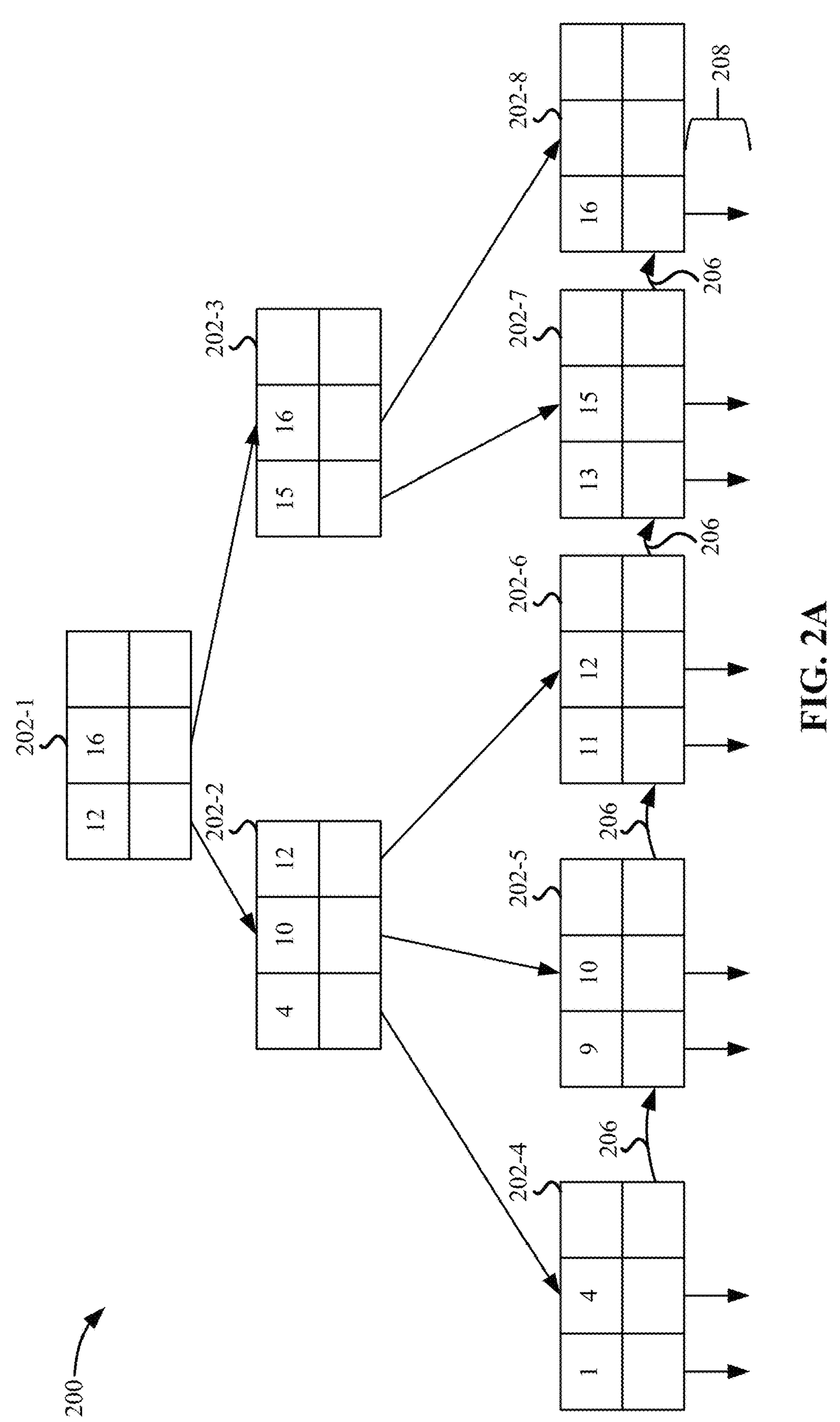
FIG. 2A depicts an example of a DB$^+$-tree according to some embodiments.

First, an example of a node structure of a DB$^+$-tree will be described. FIG. 2A depicts an example of a DB$^+$-tree according to some embodiments. The DB$^+$-tree includes nodes 202-1 to 202-8. Node 202-1 may be a root node, nodes 202-2 and 202-3 may be internal nodes, and nodes 202-4 to 202-8 may be leaf nodes. Also, if this is a partial tree, then node 202-1 may be an intermediate node of a larger tree, but the root node of the shown tree. The root node and internal nodes may store keys and references to other nodes. Keys are shown as number values and arrows are references. Each node may have one or more references to other nodes than it has keys. For example, a node with two keys may have three references to three other nodes. For every non-leaf node N with k being the number of keys in N: all keys in the leftmost child are less than the first key of the node N and all keys in the i$^{th}$ child's subtree are less than the i$^{th}$ key of next node of a different sub-tree. The key values that are stored in a node may be the maximum value of the keys in the child nodes. For example, the value of "12" in the root node 202-1 indicates node 202-2 has a maximum value of the key value of 12. Also, the value of "16" in the root node 202-1 indicates node 202-3 has a maximum value of the key value of 16.

Tree 200 may include two sub-trees. The first sub-tree includes nodes 202-1, 202-2, 202-4, 202-5, and 202-6. The second sub-tree includes nodes 202-1, 202-3, 202-7, and 202-8. The keys from the table are sorted in the leaf nodes from left to right in a sorted order from smallest to largest. For the first sub-tree, the intermediate node 202-2 includes the values of 4, 10, and 12, which indicates the first leaf node 202-4 has a maximum key value of 4, the second leaf node 202-5 has a maximum key value of 10 and the third leaf node 202-6 has a maximum key value of 12. The value of keys in leaf nodes 202-4 to 202-6 starts with the first key value of 1 in leaf node 202-4 and the last key value of third leaf node 202-6 is 12. For the second sub-tree, the intermediate node 202-3 includes the values of 15 and 16, which indicates the fourth leaf node 202-7 has a maximum key value of 15 and the fifth leaf node 202-8 has a maximum key value of 16. Leaf nodes may include a reference 206 to the next leaf node, such as from leaf node 202-4 to leaf node 202-5, leaf node 202-5 to leaf node 202-6, and so on. Also, leaf nodes may include pointers 208 to data objects that are associated with the keys. Pointers 208 allow access to data objects associated with the keys.

Figure 2B:
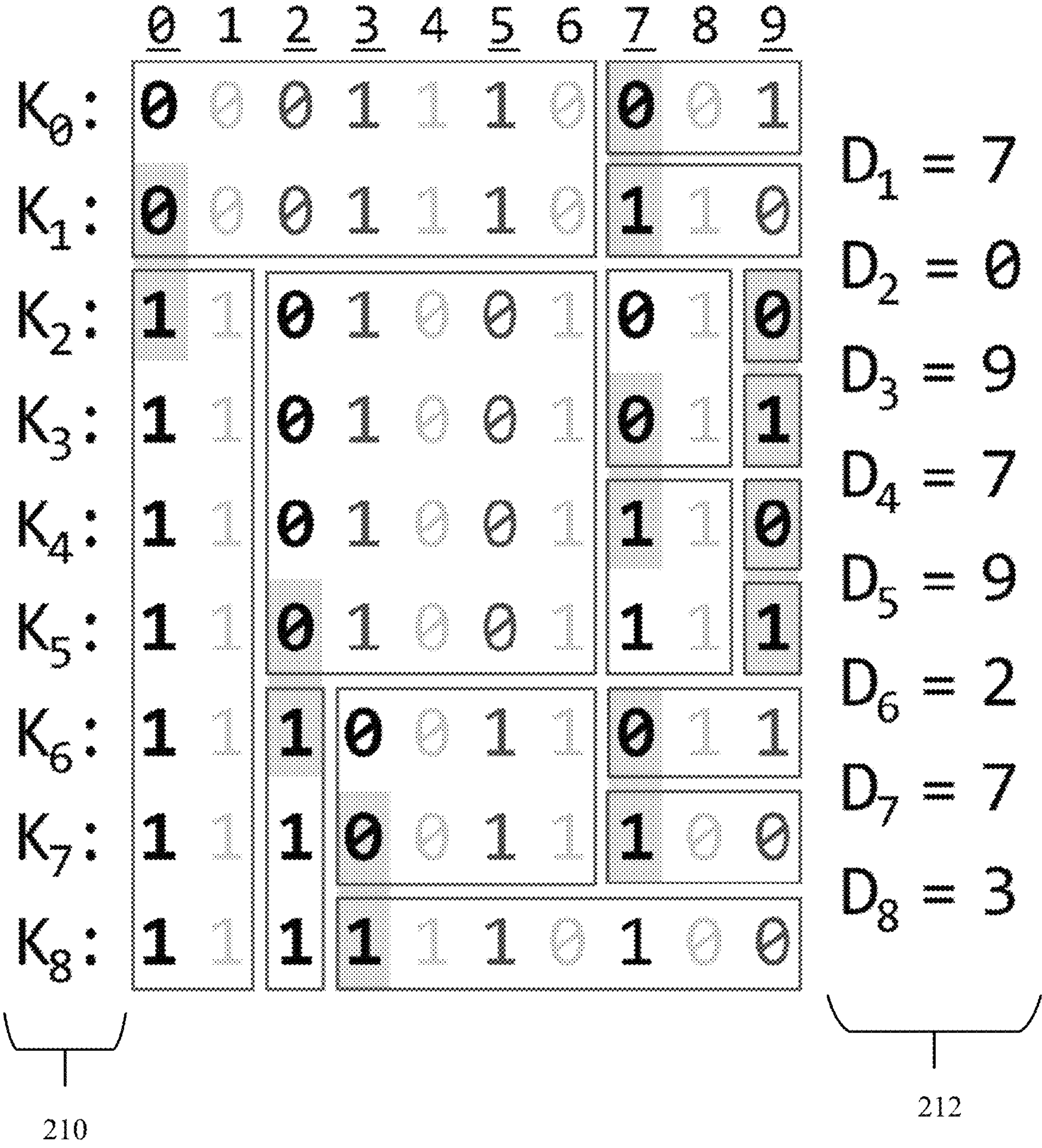
FIG. 2B depicts an example of keys for a node according to some embodiments.

More details of the DB$^+$-tree will now be discussed. Each node in the DB$^+$-tree may include information referred to as D-bit information. The D-bit information may include the information that is used to improve the performance of the branching algorithm when searching the DB$^+$-tree. To describe the D-bit information, an example of keys that are associated with a node is used. FIG. 2B depicts an example of keys for a node according to some embodiments. In some embodiments, the keys may be associated with an internal node in the DB$^+$-tree, such as nodes 202-2 and/or 202-3 in FIG. 2A. The keys are used to determine branching operations to select a child node. For example, if the query key value is 9, then query processor 106 performs a branching process that selects node 202-2. With the value of 9, query processor 106 can determine the leaf node that may contain the query key from the keys stored in node 202-2. Here, the value of 9 is in between the key values of 4 and 10, and query processor 106 selects node 202-5, which may contain the query key value.

The above process requires comparing key values. Although only a small number of keys are shown, a node may include a large number of keys, and also those keys may include a large number of bits. Instead of storing the whole key with the node, the node may store the D-bit information for the keys. The D-bit information may include less information than the full value of the keys, which requires less storage space and also less computations when performing operations with the keys, such as comparisons and updates of the keys. The process of determining the D-bit information will now be described.

At 210, each node may have N sorted keys $K_0, \ldots K_N$. The key $K_0$ is the largest key in the left sibling of the node in the tree structure. For node 202-3 in FIG. 2A, key $K_0$ is 12 and key $K_N$ is 16. If query processor 106 determines this node in the DB$^+$-tree for a query key Q, then query key Q satisfies $K_0<Q\leq K_N$. The minimum and maximum values of a node may be determined from the key values of the node in tree structure 200. Each key may have a key value, which is a binary string of binary values. Keys may be any values, but the values may be converted to binary strings for the DB$^+$-tree. As shown, the keys $K_0$ to $K_8$ may be ten bits at positions 0 to 9. The bit positions may be numbers starting from most significant bit (e.g., bit position 0) to the least significant bit (e.g., bit position 9). The values 0 to 9 are used for a 10 bit key, but other identifiers may be used. For example, key $K_0$ is equal to the bit string of "0001110001", key $K_1$ is "0001110110", and so on.

The D-bit positions is shown at 212. The D-bit position $D_i$ is referred to as a D-bit position of a node x and is associated with two adjacent keys in the sorted order. For example, a D-bit position $D_1$ is associated with the two adjacent keys $K_0$ and $K_1$, the D-bit position $D_2$ is associated with the two adjacent keys $K_1$ and $K_2$, and so on. Given N keys, there are (N−1) D-bit positions (e.g., 9−1=8 D-bit positions).

The value of the D-bit position is the position where two adjacent keys differ in value when comparing bits of the two adjacent keys from the most significant value to the least significant value. Different methods may be used to determine the D-bit positions. In some embodiments, tree structure generator 114 may include logic to compare the bit values to determine a position where the bit values that are different is found. For adjacent keys $K_0$ and $K_1$, the bit values for positions 0 to 6 are the same values of "0001110". However, in bit position 7, the value for key $K_0$ is "0" and the value for key $K_1$ is “1”. Accordingly, the D-bit position for $D_1$ is 7 ($D_1$=7), which is the position identifier of the $8^{th}$ bit of the key from the most significant bit. Similarly, for keys $K_1$ and $K_2$, the position 0 includes different values of “0” and “1”, respectively. Thus, the D-bit position $D_2$ is 0 ($D_2$=0). The other D-bit positions are also determined similarly. This results in D-bit positions of a set D={0, 2, 3, 7, 9} for the node. Note that this list is condensed by removing duplicate D-bit positions that are determined. For example, D-bit positions $D_3$ and $D_5$ both equal the value of 9.

The D-bit positions may represent branching positions of the node. Positions not found in D-bit positions may be non-branching positions. A branching position is a bit that is used to determine branching. For example, the bits at the D-bit positions include sufficient information that are necessary to determine branching decisions when performing a branching process to traverse the DB+-tree for a query key Q, which will be described in more detail below. The bits at non-branching positions are not needed to make the branching decisions.

The set D may include other positions, referred to as dummy positions, that are not D-bit positions of the node. The dummy positions may be used when updating D-bit slices and the D-bit positions when an operation is performed, such as an insertion or deletion of a key in the node. The use of dummy positions may make it more efficient to update the D-bit slices or D positions. This process will be described in more detail below. In this example, the set D is equal to {0, 2, 3, 5, 7, 9}, with position 5 being a dummy position.

Tree structure generator 114 may then generate D-bit slices using the D-bit positions. FIG. 2C shows an example of D-bit slices according to some embodiments. The D-bit slices may include the bit values from the corresponding keys at the D-bit positions. For example, D-bit slices $DS_0$ to $DS_8$ correspond to the keys $K_0$ to $K_8$, respectively. Tree structure generator 114 may select bit values for a D-bit slice from the D-bit positions in the set D. For example, D-bit slice $DS_0$ includes the bit string “001101” for the bit positions 0, 2, 3, 5, 7, and 9. The D-bit slice $DS_1$ includes the values “001110”, and so on.

The D-bit slice represents partial information that can be stored for the keys in a node. This reduces the amount of information that can be stored in a node. In some embodiments, the D-bit slices contain the information needed to indicate where branches occur for the node. When a branching process is executed to traverse the $DB^+$-tree, the D-bit slices contain sufficient information to determine which branch to take when searching the $DB^+$-tree. The branching process will be described in more detail below.

Figure 3:
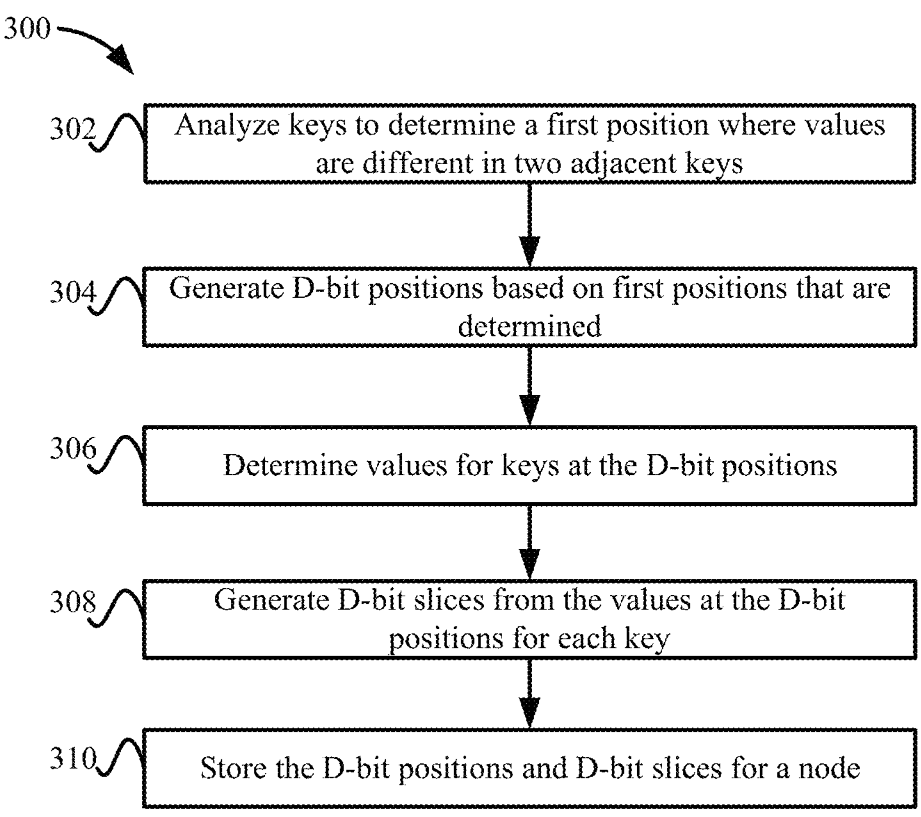
FIG. 3 depicts a simplified flowchart for generating the D-bit positions and D-bit slices according to some embodiments.

FIG. 3 depicts a simplified flowchart 300 for generating the D-bit positions and D-bit slices according to some embodiments. At 302, tree structure generator 114 analyzes the keys for a node to determine a first position of values that are different in two adjacent keys. For example, tree structure generator 114 may compare the two bits for positions of the keys to determine the most significant position where different values are found. Then, at 304, tree structure generator 114 generates D-bit positions based on the first positions of the keys that are determined. After determining the D-bit positions, at 306, tree structure generator 114 determines bit values for the keys at the D-bit positions. For example, tree structure generator 114 retrieves values for each D-bit position. At 308, tree structure generator 114 generates D-bit slices from the values of the D-bit positions for each key. Then, at 310, tree structure generator 114 stores the D-bit positions and the D-bit slices for a node. For example, tree structure generator 114 stores the values in a data structure for the node. The D-bit slices and D-bit positions may then be used for performing operations with the $DB^+$-tree. The following will describe a search operation, update operations, and a range search.

Search Operation

A query key Q may be based on a query from client system 104. To determine a result for the query, tree structure 108 is traversed from node to node. If an internal node is selected during a search operation, then the query key Q is between the first and last keys of the node, which satisfies $K_0<Q\leq K_N$. Query processor 106 may use the D-bit information to perform searches of the $DB^+$-tree. For example, the D-bit information may be used to determine which branch to take in the $DB^+$-tree. A branching problem may be defined as given sorted keys $K_0, K_1, \ldots, K_N$, and a query key Q such that ($K_0<Q\leq K_N$), find the two keys in which the query key is between in a node. The branching problem may find the value of a variable b such that $K_{b-1}<Q\leq K_b$. The value of b is used to determine the two keys in which the query key is in between. Once the two keys are found, the branch associated with the two keys can be followed to determine a next node in the $DB^+$-tree.

Figure 4:
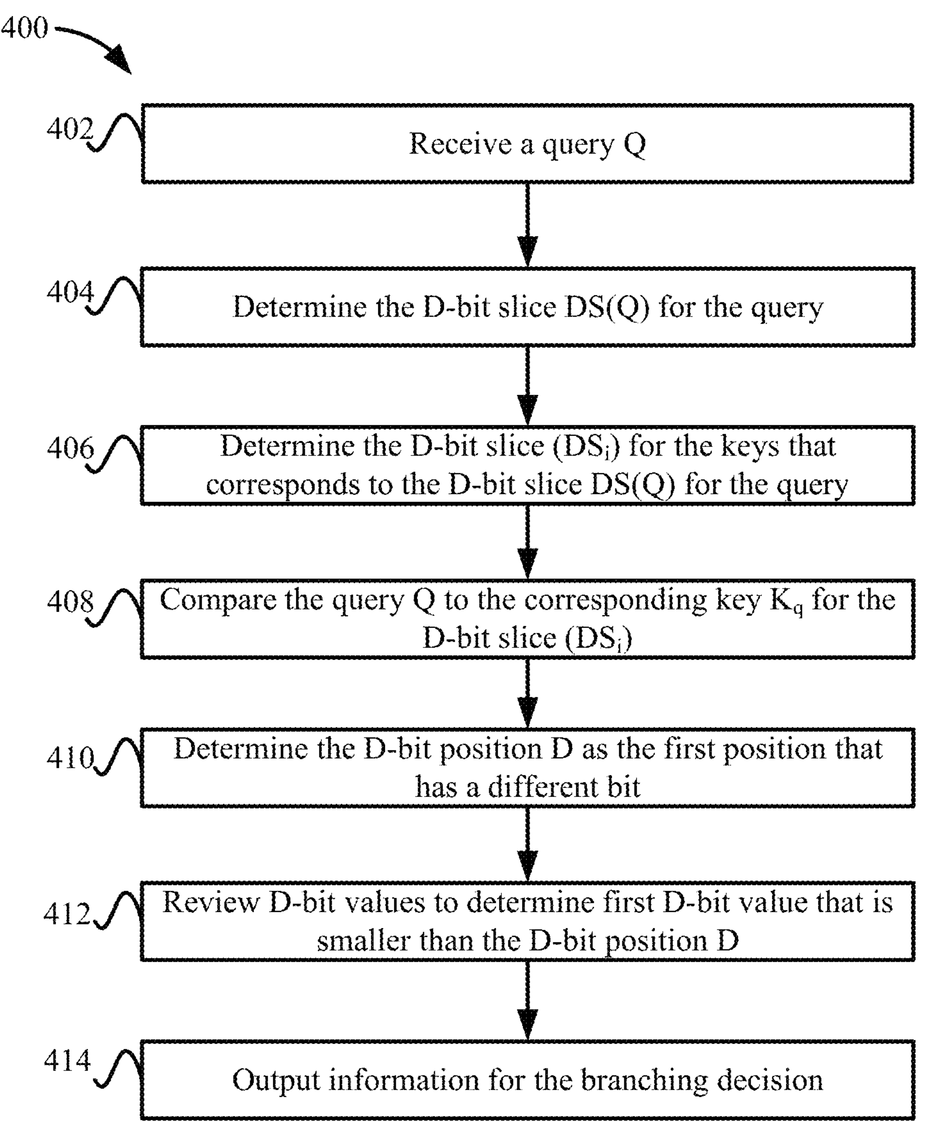
FIG. 4 depicts a simplified flowchart of a method for processing a query according to some embodiments.

FIG. 4 depicts a simplified flowchart 400 of a method for processing a query according to some embodiments. The process may solve the above branching problem using the D-bit information. At 402, query processor 106 receives a query Q. For example, the query may include the same number of bits as the keys, such as Q=1101100010. The query may be received in any format, but may be converted to a query Q. At 404, query processor 106 determines the D-bit slice DS(Q) for the query. Query processor 106 may select the values for the query key that are associated with the D-bit positions 0, 2, 3, 5, 7, and 9 in the set D to form the D-bit slice for the query (e.g., DS(Q)=101000).

At 406, query processor 106 determines a D-bit slice ($DS_i$) for the keys that corresponds to the D-bit slice DS(Q) for the query. The selected D-bit slice $DS_i$ may include the longest common prefix between the D-bit slices $DS_i$ of the keys and the D-bit slice of the query DS(Q). For example, query processor 106 may compare the bits in D-bit slice for the query key with the bits in the D-bit slices for the keys and determine which D-bit slice has the longest common prefix with the D-bit slice DS(Q). The D-bit slice $DS_2$ has a value of 10100, which equals the value of the D-bit slice DS(Q). In this case, the longest common prefix is associated with the D-bit slice $DS_2$ for key $K_2$. The D-bit slice may not have to match the query key; rather, the D-bit slice for the key that has the longest common prefix is selected. For example, if the D-bit slice $DS_2$ did not exist, the D-bit slice $DS_3$ may be selected because the first five bits of “10100” match the first five bits of the D-bit slice DS(Q). The comparison of the D-bit slices may be faster than comparing the bits of the full keys of the node and full query key because less bits need to be compared when using the D-bit slices. When the full keys are very long and multiple comparisons of different keys are performed, significant time savings may result when using the D-bit slices.

At 408, query processor 106 compares the query Q to the corresponding key $K_Q$ for the D-bit slice $DS_i$ that was selected at 406. In this case, if D-bit slice $DS_2$ is used, the corresponding key is $K_2$. The full query key and the full key are compared in this case. The full bitstring of the keys may be stored outside of the node, but may be stored with the node. The full value of the keys K may be accessed when searches are performed. The comparison is performed to determine the first position in key $K_2$ that differs from the query key Q. Key $K_2$ is "1101001010" and the query key Q is "1101100010". The first four positions [0-3] of key $K_2$ and the query key Q are the same value of "1101", but the position 4 has a value of "0" for key $K_2$ and a value of "1" for query key Q. At 410, query processor 106 determines the D-bit position D as the first position that has a different bit between the key and the query Q. This comparison determines the D-bit position between the key and the query Q, and this comparison needs to be performed using the full key values to find the longest common prefix.

At 412, query processor 106 reviews the D-bit positions for the keys to determine a first D-bit position that has smaller value than the D-bit position D determined at 410 of "4". The analysis starts from the D-bit position of 4 because the branch after this position should be determined. For example, the D-bit position D is D=4 here. The D-bit position values are $D_1=7$, $D_2=0$, $D_3=9$, $D_4=7$, $D_5=9$, $D_6=2$, $D_7=7$, $D_8=3$. Starting from D-bit position after position 4, which is D-bit position $D_5$, the value of D-bit position $D_5$ is 9, which is greater than the value of 4. Then, D-bit position $D_6$ is analyzed and found to be less than 4. Accordingly, the first D-bit position that is less than 4 is found in D-bit position $D_6$ (e.g., 2<4). This determines that the value of the full query key Q is greater than the key $K_5$ and less than the value of key $K_6$ because the change in bits is at the D-bit position of 4 with key $K_2$, which means all bits are the same until that D-bit position for the query key and key $K_2$.

At 414, query processor 106 outputs information for the branching process. For example, D-bit position $D_6$ is associated with the two adjacent keys of key $K_5$ and key $K_6$. This is the branch that should be determined for the search. That is, the query key may be found in the node that is in between keys $K_5$ and $K_6$ in the $DB^+$-tree. Since the D-bit slices contain bits at all the branching positions, query processor 106 can find a key $K_i$ such that the longest common prefix between the query Q and the key $K_i$ (e.g., LCP($QK_i$) is the maximum number of bits. Keys $K_2$, . . . $K_5$ have the same prefix of "1101" and key $K_5$ is less than the query key Q and key $K_6$ is greater than query key Q ($K_5<Q\leq K_6$). The branching position of the value 6 means this is the end of the keys having the prefix of "1101" and is the branching position that is determined for the query key Q. In this case, query processor 106 may go to the node in the $DB^+$-tree that is in between positions $K_5$ and $K_6$. Query processor 106 may traverse the $DB^+$-tree to the next node. If the node is a leaf node, query processor 106 may compare the keys in this leaf node to determine whether the query key is found in the keys of this node. If the key is found, the data object associated with the key may be accessed in data storage 110 and returned, such as via a pointer for the key. If the key is not found, a message may be returned, such as the key is not found. In other embodiments, the above process may be performed again if this is another internal node until a leaf node is reached.

FIG. 5 depicts pseudocode for performing the search described above with respect to FIG. 4 according to some embodiments. The function being performed is called Branch (x,Q) and the input to the function is a node x and a query key Q. The output is the largest integer b that indicates the branching position. In Step 1, lines 2 and 3, the longest common prefix is determined between the query key DS(Q) and the D-bit slices $DS_i$ using n copies of DS(Q). This may be a single instruction, multiple data (SIMD) instruction. That is, the algorithm does not have loops but may include O(1) number of SIMD and other sequential instructions, which leads to fast branching when performing search operations because loops are not processed, and the data may be processed in parallel. O(n) means it takes an amount of time linear with the size of the set. At line 4, the algorithm finds q, which is the D-bit slice $DS_2$ in the above example.

In step 2, line 5, the D-bit position is determined by comparing the query key Q and the key $K_q$. This was D-bit position 4 above. Only one comparison may be made using the full keys, which may save computing resources as the number of comparisons using the full keys is minimized to one comparison. In step 3, the algorithm finds the largest value of b such that key $K_{b-1}$ is less than Q. After making n copies of set D, lines 9-15 analyze the D-bit values to determine a D-bit value that is smaller than the value of D. The comparison may be performed using SIMD instructions without needing loops. The value of b=6 and D=4 is determined and returned, which is the D-bit value $D_6$ and the first differing position of 4. Query processor 106 may then use that position to determine the keys associated with the D-bit value. Although the above software code is discussed, other processes may be used.

As mentioned, the above search may perform the branching operation faster. For example, all of the full keys (or more than one) may not be compared to the query key to determine the key with the longest common prefix. While one full key may be compared to determine the D-bit position, it is only one full key instead of multiple keys. Also, the process may use only SIMD and other sequential instructions, which can execute faster compared to using loops.

Insertion and Deletion of Keys from a Node

Figure 6:
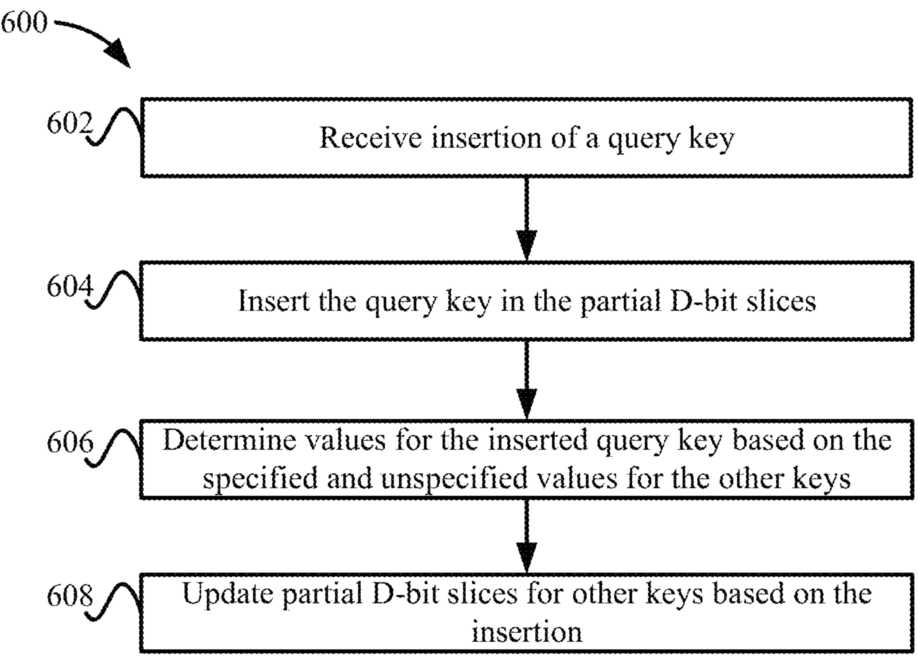
FIG. 6 depicts an example of inserting a query key into the keys of a node according to some embodiments.

In addition to searches, update operations on the $DB^+$-tree may be performed. Examples of update operations may include inserting keys into a node or deleting keys from a node using D-bit slices according to some embodiments. FIG. 6 depicts an example of inserting a query key into the keys of a node according to some embodiments. At 602, query processor 106 may receive a query key to insert into the keys for a node. The insertion may use an optimized process to insert a query key using partial D-bit slices. Partial D-bit slices may be D-bit slices that may use unspecified values for some values of the D-bit slices. The use of unspecified values may reduce the number of bit values that may need to be changed based on the insertion. The partial D-bit slices will be described below in FIGS. 7A, 7B, and FIG. 8.

At 606, query processor 106 determines values for the inserted query key based on the specified and unspecified values for other keys in the partial D-bit slices. For example, some values of the inserted query key may be changed based on the values for other keys. This will be described in more detail below in FIGS. 7A, 7B, and 8.

At 608, query processor 106 may update partial D-bit slices for other keys based on the insertion. For example, the insertion of the query key may cause different branching for the keys, and the values for other partial D-bit slices may be changed based on this.

Figure 7A:
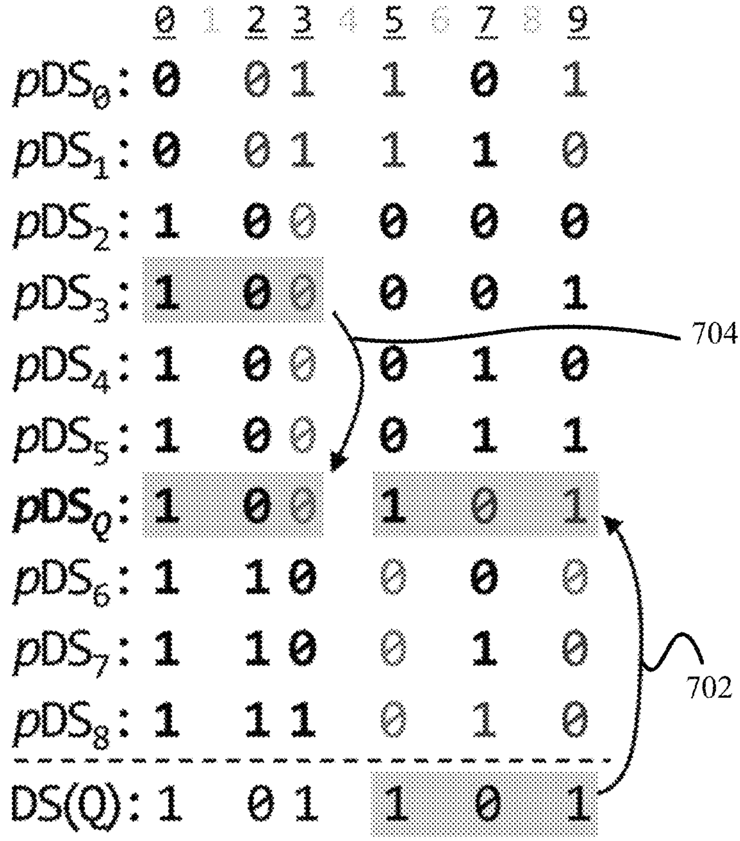
FIG. 7A depicts an example of inserting a query key according to some embodiments.

The following will now describe an example of the above process. FIG. 7A depicts an example of inserting a query key Q="1101011001" according to some embodiments. The D-bit slice for the query key is DS(Q)="101101". The partial D-bit slices are shown in FIG. 7A are for the D-bit slices of FIG. 2B. The partial D-bit slices are different from the D-bit slices in that they may contain unspecified values, which may be the value 0 in this case, or another unspecified value. Unspecified values may be located before a branch occurs or in between two branching positions. For example, for position 2, unspecified values may be found for partial D-bit slices $pDS_0$ and $pDS_1$. For position 3, unspecified values may be found for partial D-bit slices $pDS_0, \ldots pDS_Q$. For position 5, the unspecified values may be found at $pDS_0$, $pDS_1$, $pDS_6$. $pDS_7$, and $pDS_8$. For position 7, the unspecified values may be found at $pDS_Q$ and $pDS_8$. For position 9, the unspecified values may be found at $pDS_0$, $pDS_1$, and $pDS_Q, \ldots, pDS_8$.

In some embodiments, the bits in a partial D-bit slice may be defined as follows:

(1) for a branching position of key $K_i$, a bit in the partial D-bit slice $pDS_i$ as an exact value. As discussed above, a branching position may be bits where a first change in bit values occurs between two adjacent sorted keys.

(2) For a non-branching position of key $K_i$, partial D-bit slice $pDS_1$ has an exact value or is expressed as an unknown bit, which may be represented as a value, such as 0. Thus, for a non-branching position, a bit value of 0 means that its real value can be 0 or 1 while a bit value of 1 means the real value is 1.

(3) For any sub-string $\alpha$ of a partial D-bit slice $pDS_i$ and a sub-string $\beta$ of $pDS_j$ that are derived from an identical edge of a tree that represents the branching of the keys, then the values of $\alpha$ and $\beta$ are the same.

As discussed above, the unspecified bits may be 0 or 1. One advantage of using the value of 1 for an unspecified bit is that the partial D-bit slice may be set as the D-bit slice. The use of unspecified values may reduce key accesses that may be required when keys are inserted or deleted. For example, some keys may not need to be accessed to change the values because the bits that need to be changed are unspecified.

The use of the unspecified values for inserting a key will now be explained. The insertion of the query key should be in between two existing sorted keys. As shown at 702, the value of D-bit slice DS(Q) is in between partial D-bit slice $pDS_5$ and $pDS_6$ (e.g., 100011<100101<110000). At 704, some of the bits of the inserted partial D-bit slice $pDS_Q$ may be changed to be unspecified. The unspecified value may be 0, or another unspecified value. In this case, the bit in position 3 of the partial D-bit slice $pDS_Q$ is changed from the value of "1" to the unspecified value of "0". The reason the value is changed to 0 is that the prior values for the keys are 0 in sub-strings of keys that are at an identical edge of the branching position as noted by definition (3) above. As discussed above, the unspecified values are bits that are at non-branching positions. These bits can be changed because they are not important when trying to determine the branching of the node. Only bits that are located at branching positions need be specified. After the change of one bit to an unspecified bit, the final partial D-bit slice $pDS_Q$ is "100101".

Figure 7B:
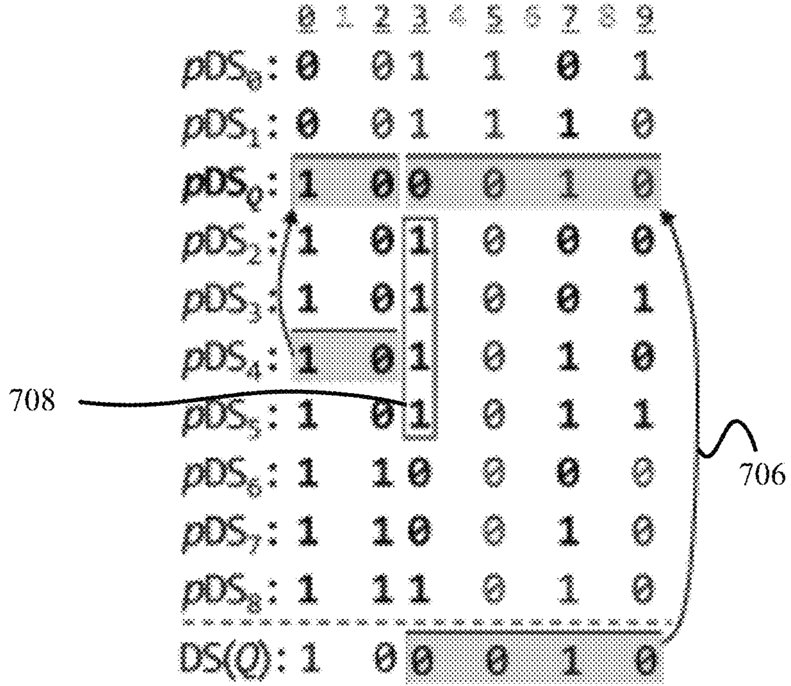
FIG. 7B shows an example of inserting a query key that changes unspecified values according to some embodiments.

The insertion of a query key may also change unspecified values to specified values. FIG. 7B shows an example of inserting a query key that changes unspecified values according to some embodiments. The query key Q is "1100001100" and the D-bit slice is DS(Q) "100010". The partial D-bit slice $pDS_Q$ is inserted between partial D-bit slice $pDS_1$ and $pDS_2$ at 706. The first two values are "10" from partial D-bit slice $pDS_4$.

The insertion of partial D-bit slice $pDS_2$ causes a change in the unspecified values as shown at 708. This is because there is now a branch at position 3 between partial D-bit slice $pDS_Q$ and $pDS_2$ due to the insertion of partial D-bit slice $pDS_2$. In some embodiments, the longest common prefix of query key Q and key $K_2$ is at position 3 and the value of key $K_2$ cannot be unspecified at that position. Because the values are at an identical edge of the branching position at $pDS_2$, the unspecified values of 0 should be changed back to the original values of 1 for partial D-bit slices $pDS_3, \ldots pDS_5$.

The unspecified values may be set when a new D-bit position is created by an insertion or deletion. The D-bit position is added and one bit corresponding to position D is inserted in every partial D-bit slice $pDS_i$ as follows. First, the bit is set as 0 (unknown bit) without accessing key $K_i$ and then partial D-bit slices are computed as described above. Not having to access keys to set a value is an improvement in using fewer computing resources because accessing keys is expensive.

Figure 8:
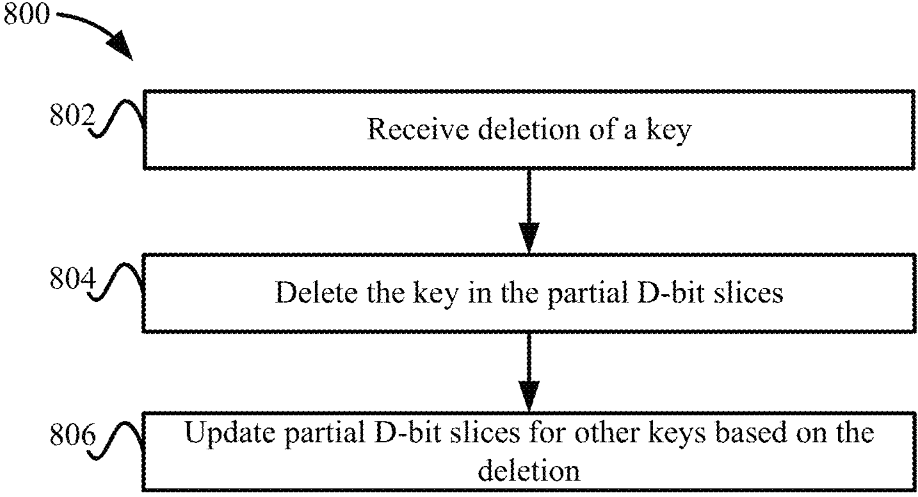
FIG. 8 depicts a simplified flowchart of a method for processing a deletion of a key according to some embodiments.

FIG. 8 depicts a simplified flowchart 800 of a method for processing a deletion of a key according to some embodiments. At 802, query processor 106 receives a deletion of a key. At 804, query processor 106 deletes the key in the partial D-bit slices. Then, at 806, query processor 106 may update the partial D-bit slices for other keys based on the deletion. For example, the deletion of a key may change the branching for the node. The values for the partial D-bit slices may need to be updated based on the different branching. However, as discussed above, if unspecified values need to be changed, these values may not need to be changed since they are unspecified.

As discussed above, D-bit slices may have dummy positions, which may be used in the insertion and deletion of keys. The insertion of a key may cause a new D-bit position to be encountered between the keys. The use of dummy positions may not require accessing each key to insert the value of the bit for the new D-bit position. Rather, the dummy position values have already been added when the D-bit slice was created, and thus these accesses are saved when the query key is inserted.

Range Search

A range search may be performed more efficiently using the D-bit information. The range search may be a search that finds keys that meet a range that is between two keys $Q_1$ and $Q_2$ where $Q_1<Q_2$. In a range search of RangeSearch1($Q_1$, $Q_2$), the search is defined as finding all keys k that meet a condition of $Q_1 \leq k < Q_2$ in the index. Also, a range search RangeSearch2($Q_1$, R) may be: given a key $Q_1$ and a positive integer R, find the R smallest keys larger than or equal to query key $Q_1$. The range search may be performed by first searching for query key $Q_1$ and then scanning the leaf nodes rightward until a larger than or equal to key $Q_2$ is found for RangeSearch1($Q_1$, $Q_2$). For RangeSearch2(Q1, R), R keys are reported after query key $Q_1$.

Figure 9:
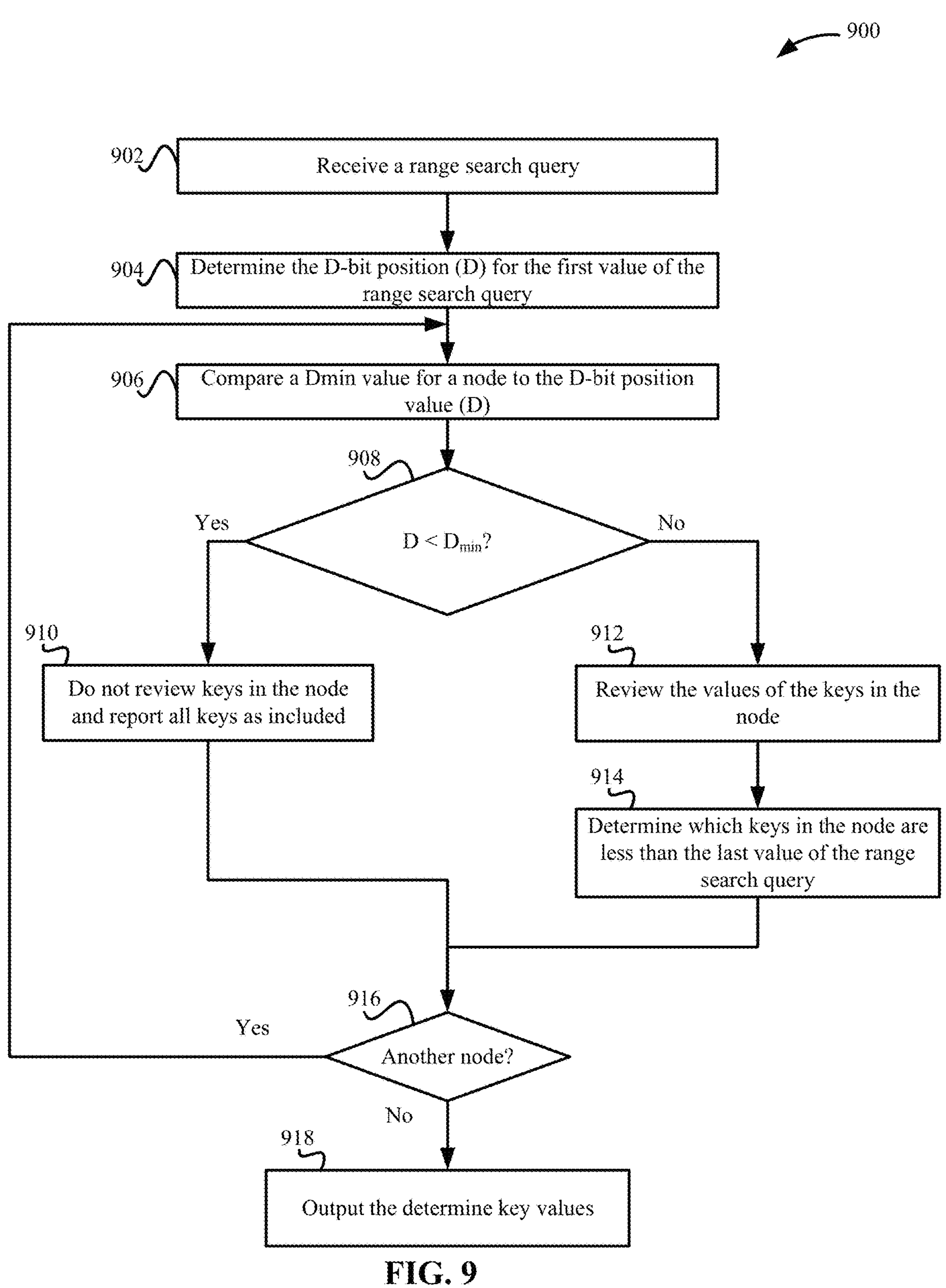
FIG. 9 depicts a simplified flowchart of a method for performing a range search according to some embodiments.

FIG. 9 depicts a simplified flowchart 900 of a method for performing a range search according to some embodiments. At 902, query processor 106 receives a range search query. At 904, query processor 106 determines the D-bit position (D) for the first value of the range search query. This may use the process described in FIG. 4.

A value $D_{min}$ may be used to improve the performance of the range search algorithm. The value $D_{min}$ represents the minimum D-bit position found in the node. At 906, query processor 106 compares a $D_{min}$ value for a node to the D-bit position value (D). If the D-bit position value (D) is less than the $D_{min}$ value ($D<D_{min}$), at 910, query processor 106 does not need to review the keys in the node. This is because all the keys in this node may be reported as being included in the range search output. This is because if D is less than the minimum value of the keys found in this node, all the keys in this node may be included in the range search because the value of query key $Q_2$ has not been reached.

At 912, if the value of D is greater than $D_{min}$, query processor 106 reviews the values of the key in the node. At 914, query processor 106 determines which keys in the node are less than the last value of the range search query $Q_2$. In this case, the value of D may be greater than the minimum value of the keys in the node, but not greater than the last value of the keys in the node. If the value of D is not greater than the last value of the range search query $Q_2$, all keys of the node may be included in the output.

At 916, it is determined if another node needs to be processed. If so, the process reiterates to 906. If not, at 918, query processor 106 outputs the determined key values.

For range search 2, the above process may be performed until R keys are reported for the output.

Data Structure

Figure 10:
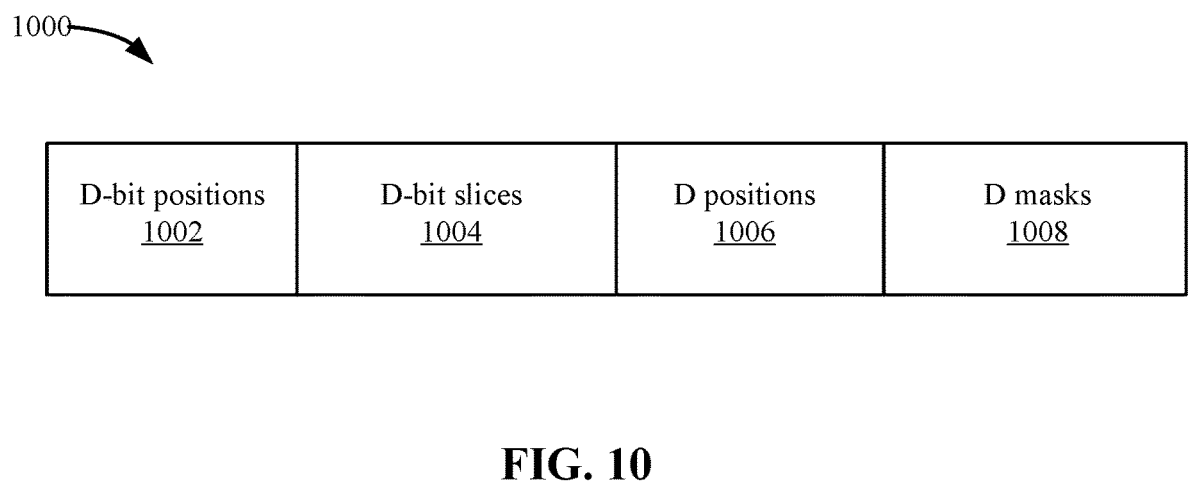

FIG. 10 depicts an example of a data structure 1000 for a node according to some embodiments. Data structure 1000 includes D-bit positions 1002, D-bit slices 1004, D positions 1006, and D-masks 1008. D positions 1006 and D-masks 1008 may be used to determine the bit positions of the set D. The D-mask may be a bit mask that includes byte positions that each include 8 bits. The D positions indicate the byte position where a D-bit position exists. Then, any bit that is set in the bit mask of that byte position corresponds to a value in the set D. Other implementations may also exist for indicating the set D. Using the D positions and the bit mask may allow fast extraction of the D-bit slice DS(Q) from the query key.

Conclusion

Accordingly, a D-bit$^+$ tree may enhance the processing for determining keys by improving the branching algorithm. The branching time when performing the searching of the D-bit$^+$-tree may be significantly reduced compared to other tree structures. This may lead to a fast search, range search, and up the operations.

System

Figure 11:
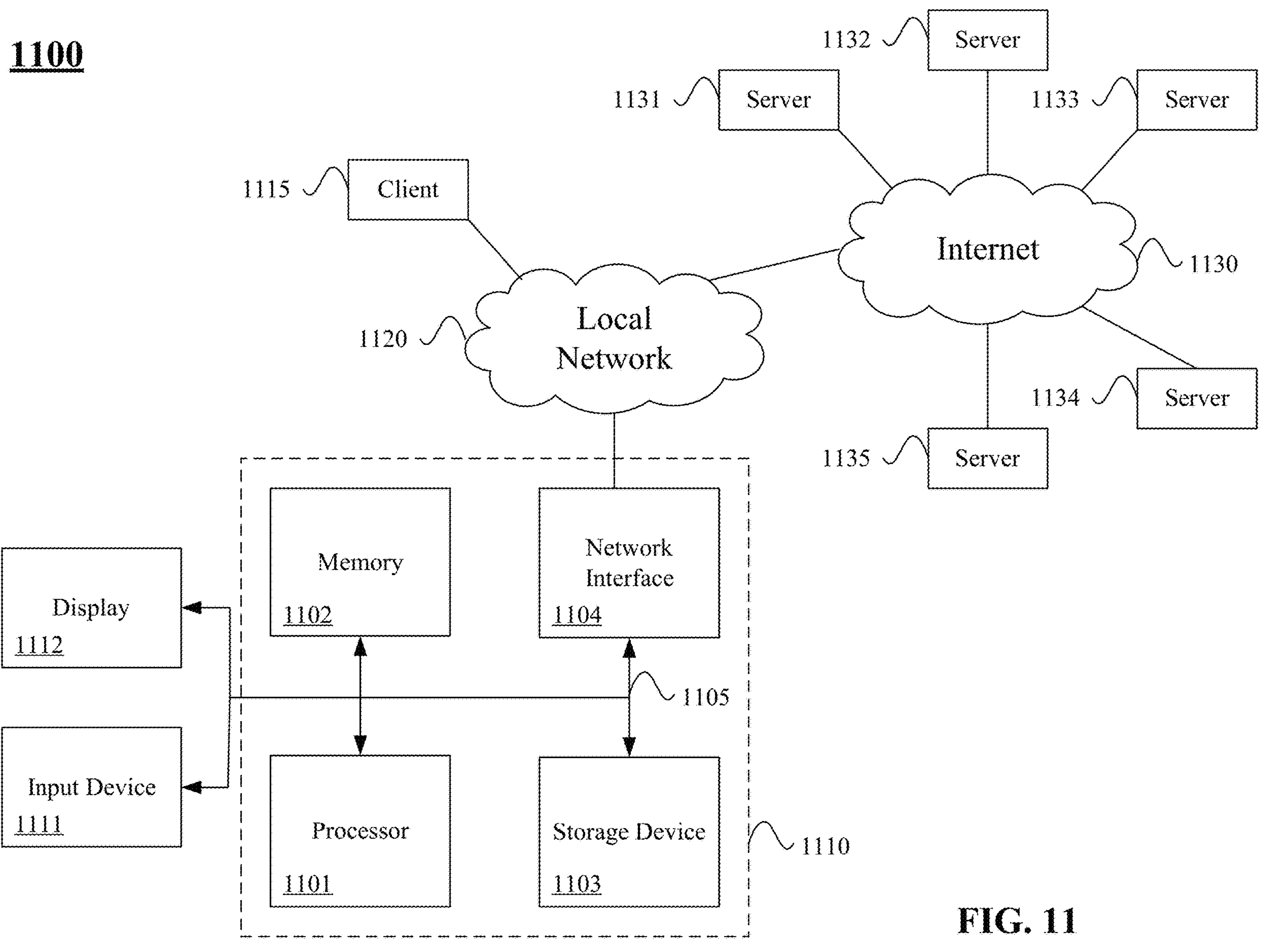
FIG. 11 illustrates an example of special purpose computer systems configured with a database system according to one embodiment.

FIG. 11 illustrates an example of special purpose computer systems 1100 configured with database system 102 according to one embodiment. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as servers 1131-1135. Accordingly, computer system 1110 and server computer systems represented by servers 1131-1135 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131-1135 may transmit actions or messages from one component, through Internet 1130, local network 1120, and network interface 1104 to a component on computer system 1110. The software components and processes described above may be implemented on any computer system and send and/or receive information across a network, for example.

EXAMPLE EMBODIMENTS

In some embodiments, a method for performing an operation on a data structure, wherein nodes in the data structure include a set of keys, the method comprising: determining, by a computing device, a query distinction bit (D-bit) slice for a query key using values at D-bit positions that are associated with a node in the data structure, wherein D-bit positions are determined based on branches in the data structure; selecting, by the computing device, a D-bit slice for a key in the set of keys for the node based on the D-bit slice of the query key; comparing, by the computing device, a key value for the key to a query key value for the query key to determine a first D-bit position value; and selecting, by the computing device, a D-bit position that has a second D-bit position value that is smaller in value than the first D-bit position value, wherein the D-bit position is used to determine a result for the query key.

In some embodiments, the D-bit position is used to determine a first key and a second key that are associated with the D-bit position.

In some embodiments, the node comprises a first node, a branch associated with the first key and the second key is traversed to select a second node, and the query key is searched for in the second node.

In some embodiments, a pointer associated with a key that corresponds to the query key in the second node is used to retrieve the result for the query key.

In some embodiments, the method further comprising: storing D-bit slices for the set of keys for the node.

In some embodiments, the method further comprising: analyzing two keys in the set of keys to determine a most significant bit position that changes value in the two keys; and determining that the most significant position is a D-bit position for the two keys.

In some embodiments, the method further comprising: selecting values for the D-bit positions for the keys to form the D-bit slices for the set of keys.

In some embodiments, selecting the D-bit slice for the key comprises: selecting the D-bit slice that is closest in value to the D-bit slice for the query key.

In some embodiments, comparing the key value for the key to the query key value for the query key comprises: comparing key values of the key to query key values of the query key to determine a most significant value that differs between the key value and the query key value.

In some embodiments, selecting the D-bit position that has the second value that is smaller in value than the first value comprises: comparing D-bit position values for D-bit positions that are greater than the D-bit position until the D-bit position that has the second value that is smaller than the first value is determined.

In some embodiments, the method further comprising: receiving an insertion key to insert into the set of keys for the node; determining a D-bit slice for the insertion key; and comparing the D-bit slice for the insertion key to the D-bit slices for the set of keys to determine where to insert the insertion key in the set of keys.

In some embodiments, the set of keys include unspecified values, wherein an unspecified value may be different from a value of the key; and changing a value of the D-bit slice for the insertion key to an unspecified value based on another D-bit slice in the set of keys having an unspecified value.

In some embodiments, the method further comprising: receiving a deletion key to delete from the set of keys for the node; determining a D-bit slice for the deletion key; and comparing the D-bit slice for the deletion key to the D-bit slices for the set of keys to determine a key to delete in the set of keys.

In some embodiments, the query key includes a first query key and a second query key, the method further comprising: searching other nodes to determine whether respective sets of keys in the other nodes meet a range defined by the first query key and the second query key.

In some embodiments, the query key includes a first query key and a range value, the method further comprising: searching other nodes to determine whether respective sets of keys in the other nodes meet a range defined by the first query key and the range value.

In some embodiments, a non-transitory computer-readable storage medium having stored thereon computer executable instructions for performing an operation on a data structure, wherein the instructions, when executed by a computing device, cause the computing device to be operable for: determining a query distinction bit (D-bit) slice for a query key using values at D-bit positions that are associated with a node in the data structure, wherein D-bit positions are determined based on branches in the data structure; selecting a D-bit slice for a key in the set of keys for the node based on the D-bit slice of the query key; comparing a key value for the key to a query key value for the query key to determine a first D-bit position value; and selecting a D-bit position that has a second D-bit position value that is smaller in value than the first D-bit position value, wherein the D-bit position is used to determine a result for the query key.

In some embodiments, the D-bit position is used to determine a first key and a second key that are associated with the D-bit position.

In some embodiments, the node comprises a first node, a branch associated with the first key and the second key is traversed to select a second node, and the query key is searched for in the second node.

In some embodiments, analyzing two keys in the set of keys to determine a most significant bit position that changes value in the two keys; and determining that the most significant position is a D-bit position for the two keys.

In some embodiments, an apparatus for performing an operation on a data structure, the apparatus comprising: one or more computer processors; and a computer-readable storage medium comprising instructions for controlling the one or more computer processors to be operable for: determining a query distinction bit (D-bit) slice for a query key using values at D-bit positions that are associated with a node in the data structure, wherein D-bit positions are determined based on branches in the data structure; selecting a D-bit slice for a key in the set of keys for the node based on the D-bit slice of the query key; comparing a key value for the key to a query key value for the query key to determine a first D-bit position value; and selecting a D-bit position that has a second D-bit position value that is smaller in value than the first D-bit position value, wherein the D-bit position is used to determine a result for the query key.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method for performing an operation on a data structure, wherein nodes in the data structure include a set of keys, the method comprising:

analyzing, for each pair of adjacent keys in the set of keys, two keys in the pair of adjacent keys to determine a most significant bit position that changes value in the two keys, wherein the most significant bit position that changes value in the two keys is a distinction bit (D-bit) position;

generating a D-bit positions set based on the D-bit position determined for each pair of adjacent keys in the set of keys, wherein each D-bit position in the D-bit positions set is unique;

selecting, for each key in the set of keys, values of the key at each D-bit position included in the D-bit positions set;

forming a plurality of D-bit slices based on the selected values of the key, wherein each key in the set of keys corresponds to a different D-bit slice in the plurality of D-bit slices;

receiving a query comprising a query key;

for one or more nodes of the data structure:

determining, by a computing device, a query D-bit slice for the query key using values at D-bit positions that are associated with a node in the data structure;

selecting, by the computing device, a D-bit slice corresponding to a key in the set of keys for the node based on the D-bit slice of the query key;

comparing, by the computing device, a key value for the key to a query key value for the query key to determine a first D-bit position value; and selecting, by the computing device, a D-bit position corresponding to a second D-bit position value that is smaller in value than the first D-bit position value; and branching to a next node based on the selected D-bit position; and when the next node is a leaf node, comparing one or more keys of the next node to the query key and returning data associated with the query key in response to the query.

2. The method of claim 1, wherein the D-bit position is used to determine a first key and a second key that are associated with the D-bit position.

3. The method of claim 2, wherein:

the node comprises a first node, a branch associated with the first key and the second key is traversed to select a second node, and the query key is searched for in the second node.

4. The method of claim 3, wherein a pointer associated with a key that corresponds to the query key in the second node is used to retrieve the result for the query key.

5. The method of claim 1, further comprising:

storing the plurality of D-bit slices for the set of keys for the node.

6. The method of claim 5, wherein keys in the set of keys comprise a plurality of bit positions ordered according to a decreasing significance associated with each bit position, wherein keys in the set of keys are associated with a first length based on the plurality of bit positions, and wherein storing the plurality of D-bit slices for the set of keys further comprises storing partial information for the set of keys such that the partial information corresponds to the decreasing significance associated with each bit position and comprises a second length that is shorter than the first length.

7. The method of claim 1, wherein selecting the D-bit slice for the key comprises:

selecting the D-bit slice that is closest in value to the D-bit slice for the query key.

8. The method of claim 1, wherein comparing the key value for the key to the query key value for the query key comprises:

comparing key values of the key to query key values of the query key to determine a most significant value that differs between the key value and the query key value.

9. The method of claim 1, wherein selecting the D-bit position that has the second value that is smaller in value than the first value comprises:

comparing D-bit position values for D-bit positions that are greater than the D-bit position until the D-bit position that has the second value that is smaller than the first value is determined.

10. The method of claim 1, further comprising:

receiving an insertion key to insert into the set of keys for the node;

determining a D-bit slice for the insertion key; and comparing the D-bit slice for the insertion key to the D-bit slices for the set of keys to determine where to insert the insertion key in the set of keys.

11. The method of claim 10, wherein:

the set of keys include unspecified values, wherein an unspecified value may be different from a value of the key; and changing a value of the D-bit slice for the insertion key to an unspecified value based on another D-bit slice in the set of keys having an unspecified value.

12. The method of claim 1, further comprising:

receiving a deletion key to delete from the set of keys for the node;

determining a D-bit slice for the deletion key; and comparing the D-bit slice for the deletion key to the D-bit slices for the set of keys to determine a key to delete in the set of keys.

13. The method of claim 1, wherein the query key includes a first query key and a second query key, the method further comprising:

searching other nodes to determine whether respective sets of keys in the other nodes meet a range defined by the first query key and the second query key.

14. The method of claim 1, wherein the query key includes a first query key and a range value, the method further comprising:

searching other nodes to determine whether respective sets of keys in the other nodes meet a range defined by the first query key and the range value.

15. A non-transitory computer-readable storage medium having stored thereon computer executable instructions for performing an operation on a data structure, wherein nodes in the data structure include a set of keys, wherein the instructions, when executed by a computing device, cause the computing device to be operable for:

analyzing, for each pair of adjacent keys in the set of keys, two keys in the pair of adjacent keys to determine a most significant bit position that changes value in the two keys, wherein the most significant bit position that changes value in the two keys is a distinction bit (D-bit) position;

generating a D-bit positions set based on the D-bit position determined for each pair of adjacent keys in the set of keys, wherein each D-bit position in the D-bit positions set is unique;

selecting, for each key in the set of keys, values of the key at each D-bit position included in the D-bit positions set;

forming a plurality of D-bit slices based on the selected values of the key, wherein each key in the set of keys corresponds to a different D-bit slice in the plurality of D-bit slices;

receiving a query comprising a query key;

for one or more nodes of the data structure:

determining a query D-bit slice for the query key using values at D-bit positions that are associated with a node in the data structure;

selecting a D-bit slice corresponding to a key in the set of keys for the node based on the D-bit slice of the query key;

comparing a key value for the key to a query key value for the query key to determine a first D-bit position value; and selecting a D-bit position corresponding to a second D-bit position value that is smaller in value than the first D-bit position value; and branching to a next node based on the selected D-bit position; and when the next node is a leaf node, comparing one or more keys of the next node to the query key and returning data associated with the query key in response to the query.

16. The non-transitory computer-readable storage medium of claim 15, wherein the D-bit position is used to determine a first key and a second key that are associated with the D-bit position.

17. The non-transitory computer-readable storage medium of claim 16, wherein:

the node comprises a first node, a branch associated with the first key and the second key is traversed to select a second node, and the query key is searched for in the second node.

18. The non-transitory computer-readable storage medium of claim 15 further comprising storing the plurality of D-bit slices for the set of keys for the node, wherein keys in the set of keys comprise a plurality of bit positions ordered according to a decreasing significance associated with each bit position, wherein keys in the set of keys are associated with a first length based on the plurality of bit positions, and wherein storing the plurality of D-bit slices for the set of keys further comprises storing partial information for the set of keys such that the partial information corresponds to the decreasing significance associated with each bit position and comprises a second length that is shorter than the first length.

19. An apparatus for performing an operation on a data structure, wherein nodes in the data structure include a set of keys, the apparatus comprising:

one or more computer processors; and a computer-readable storage medium comprising instructions for controlling the one or more computer processors to be operable for:

analyzing, for each pair of adjacent keys in the set of keys, two keys in the pair of adjacent keys to determine a most significant bit position that changes value in the two keys, wherein the most significant bit position that changes value in the two keys is a distinction bit (D-bit) position;

generating a D-bit positions set based on the D-bit position determined for each pair of adjacent keys in the set of keys, wherein each D-bit position in the D-bit positions set is unique;

selecting, for each key in the set of keys, values of the key at each D-bit position included in the D-bit positions set;

forming a plurality of D-bit slices based on the selected values of the key, wherein each key in the set of keys corresponds to a different D-bit slice in the plurality of D-bit slices;

receiving a query comprising a query key;

for one or more nodes of the data structure:

determining a query D-bit slice for the query key using values at D-bit positions that are associated with a node in the data structure;

selecting a D-bit slice corresponding to a key in the set of keys for the node based on the D-bit slice of the query key;

comparing a key value for the key to a query key value for the query key to determine a first D-bit position value; and selecting a D-bit position corresponding to a second D-bit position value that is smaller in value than the first D-bit position value; and branching to a next node based on the selected D-bit position; and when the next node is a leaf node, comparing one or more keys of the next node to the query key and returning data associated with the query key in response to the query.

20. The apparatus for performing the operation on the data structure of claim 19, the apparatus further comprising:

storing the plurality of D-bit slices for the set of keys for the node, wherein keys in the set of keys comprise a plurality of bit positions ordered according to a decreasing significance associated with each bit position, wherein keys in the set of keys are associated with a first length based on the plurality of bit positions, and wherein storing the plurality of D-bit slices for the set of keys further comprises storing partial information for the set of keys such that the partial information corresponds to the decreasing significance associated with each bit position and comprises a second length that is shorter than the first length.

* * * * *